(12) United States Patent
Turbe et al.

(10) Patent No.: US 8,329,332 B2
(45) Date of Patent: Dec. 11, 2012

(54) ELECTROCHEMICAL STORAGE CELL RETENTION SYSTEM

(75) Inventors: Benoit Turbe, Bordeaux (FR); Alexandre Narbonne, Bordeaux (FR)

(73) Assignee: SAFT, Bagnolet (FR)

( * ) Notice: Subject to any disclaimer, the term of this patent is extended or adjusted under 35 U.S.C. 154(b) by 305 days.

(21) Appl. No.: 12/638,282

(22) Filed: Dec. 15, 2009

(65) Prior Publication Data

US 2010/0151314 A1    Jun. 17, 2010

(30) Foreign Application Priority Data

Dec. 16, 2008 (FR) ...................... 08 07051

(51) Int. Cl.
*H01M 6/44* (2006.01)
(52) U.S. Cl. ........ 429/121; 429/175; 429/170; 429/149; 429/167; 429/153; 429/155
(58) Field of Classification Search .................. 429/121, 429/175, 170, 149, 164, 153, 155
See application file for complete search history.

(56) References Cited

U.S. PATENT DOCUMENTS

2009/0155680 A1*  6/2009  Maguire et al. ............... 429/158

FOREIGN PATENT DOCUMENTS

| EP | 1 109 237 A1 | 6/2001 |
| EP | 1953848 A1 | 8/2008 |
| WO | 2008/074034 A1 | 6/2008 |

OTHER PUBLICATIONS

European Search Report, Apr. 6, 2010.

* cited by examiner

*Primary Examiner* — Jane Rhee
(74) *Attorney, Agent, or Firm* — Sughrue Mion, PLLC

(57) ABSTRACT

An electrochemical storage cell retention system is provided for storage cells (1) with a container comprising a bottom portion (12), and a top portion (11) provided with electrical output terminals (13, 14). The system comprises a first tray member (2) provided with through openings (20) and a plurality of adapter cups (3), each adapter cup (3) being designed to be placed on the top portion (11) of a storage cell (1) and to be received in one of the through openings (20) of the first tray member. The retention system is modular and mechanically strong.

12 Claims, 3 Drawing Sheets

ELECTROCHEMICAL STORAGE CELL RETENTION SYSTEM

The present invention relates to a retention system for the electrochemical storage cells making up a battery.

A battery generally comprises a plurality of electrochemical storage cells arranged side-by-side. Each storage cell comprises electrical output terminals connected to the electrical output terminals of adjacent cells. It is necessary to retain the storage cells in place to prevent them shifting once assembled into the battery.

Various mechanical retention solutions have been proposed.

JP-A-2007 328926 discloses a battery module which includes two, an upper and a lower, storage cell retaining plates.

WO-A-2008/074034 discloses a battery module comprising upper and lower trays. The upper and lower tray each have, on one of their faces, a plurality of housings or sockets, each housing being configured to receive one cell. The lower tray also includes a chamber configured to confine gas possibly released by one or more of the storage cells in case of malfunction.

EP-A-1,109,237 discloses a battery module comprising two—an upper and a lower—holding boards for the electrochemical cells. One of the faces of these holding boards includes a plurality of recesses adapted to receive the electrochemical cells. The other face of the upper holding board has recesses for receiving electrical connections.

In all of these documents, the retaining trays or holding boards are specific to one single storage cell format. For instance, if there is a change in cell diameter or if the position of the storage cell output terminals varies, the retaining tray or board needs changing. They are consequently not modular.

Additionally, the trays or boards need to have limited thickness in the region where they bear against the storage cell in order not to exceed the height of the cell output terminals, and thereby not prevent the cells being connected one to the other. This limiting of tray or board thickness is detrimental to mechanical retention strength.

SUMMARY OF THE INVENTION

There is consequently a need for an electrochemical storage cell retention system which is modular and mechanically strong.

This is achieved in the invention by an electrochemical storage cell retention system in which each storage cell has a container comprising a bottom portion, and a top portion provided with electrical output terminals, the system comprising: a first tray member provided with through openings; a plurality of adapter cups, each adapter cup being designed to be placed on the top portion of a storage cell and to be received in one of the through openings of the first tray member.

Depending on the embodiment, the electrochemical storage cell retention system of the invention can comprise one or several of the following characteristics:
each adapter cup is of an electrically insulating material.
each first tray member is of an electrically conducting material.
each adapter cup is of an electrically conducting material.
each first tray member is of an electrically insulating material.
each adapter cup includes a shoulder portion acting as an abutment at the first tray member.
each adapter cup includes at least one boss portion for retaining the first tray member.
each adapter cup includes cut-out portions at its sides.
each adapter cup includes two holes of differing sizes and a marking for electrical polarity, each one of the holes allowing the passage of one of the electrical output terminals of a storage cell.
each adapter cup further includes a locating lug.

The storage cell retention system according to the invention can further comprise:
a second tray member provided with through openings;
a plurality of rings, each ring being adapted to be placed on the bottom portion of the storage cell and to be received in one of the through openings of the second tray member.

Depending on the embodiment, the electrochemical storage cell retention system of the invention can comprise one or several of the following characteristics:
each ring is of an electrically insulating material.
each second tray member is of an electrically conducting material.
each ring is of an electrically conducting material.
each second tray member is of an electrically insulating material.
each ring is provided with a base including a frangible disc.
each ring includes a shoulder portion acting as an abutment at the second tray member.
each ring includes a least one boss portion for retention of the second tray member.

The invention also provides a battery comprising a plurality of electrochemical storage cells and a retention system according to the invention.

Further characteristics and advantages of the invention will become more clear from the detailed description below of some embodiments of the invention provided solely by way of example and with reference to the attached drawings.

DETAILED DESCRIPTION OF PREFERRED EMBODIMENTS

Figure 1:
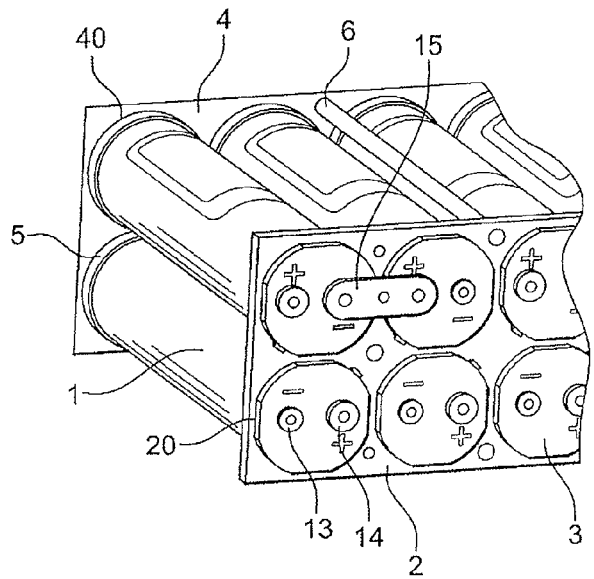
FIG. 1 is a perspective view of a retention system with storage cells mounted.

Those parts which are identical or similar in the various drawings are identified by the same reference numerals.

The invention provides an electrochemical storage cell retention system, each storage cell having a container with a bottom portion and a top portion which is fitted with electrical output terminals. The retention system comprises a first tray member provided with through openings, and a plurality of adapter cups. Each adapter cup is adapted for fitting on the top portion of a storage cell and for being received in one of the through openings of the first tray member.

The retention system of the invention is modular. The adapter cups are in effect adapted to the specific cells they are to receive. The first tray member, in comparison, can be used with different adapter cups. Thus, if there is a change in storage cell diameter or if the position of the cell output terminal varies, it is only necessary to change the adapter cups, but not the tray member. Similarly, if one adapter cup gets damaged, only this cup needs changing, and not the complete tray member.

Further, there is a shift in the region where the storage cells are mechanically retained to the container body, freeing up access to the electrical output terminals. Thus, the tray member can be as thick as is necessary to ensure good mechanical strength of the retention system, once mounted. The retention system of the invention is consequently mechanically stronger than prior art systems.

The retention system further comprises a second tray member provided with through openings and a plurality of rings. Each ring is adapted for fitting to the bottom portion of a storage cell, and for being received in one of the through openings of the second tray member.

The retention system of the invention is further modular as regards the second tray member and the rings. In effect, each ring is adapted to the storage cells it is required to receive. The same second tray member can in comparison be used with different rings. Thus, if the diameter of the storage cells changes, only the rings need changing, but not the tray member. Similarly, if one ring gets damaged, only the ring needs changing, and not the whole tray member.

Figure 6:
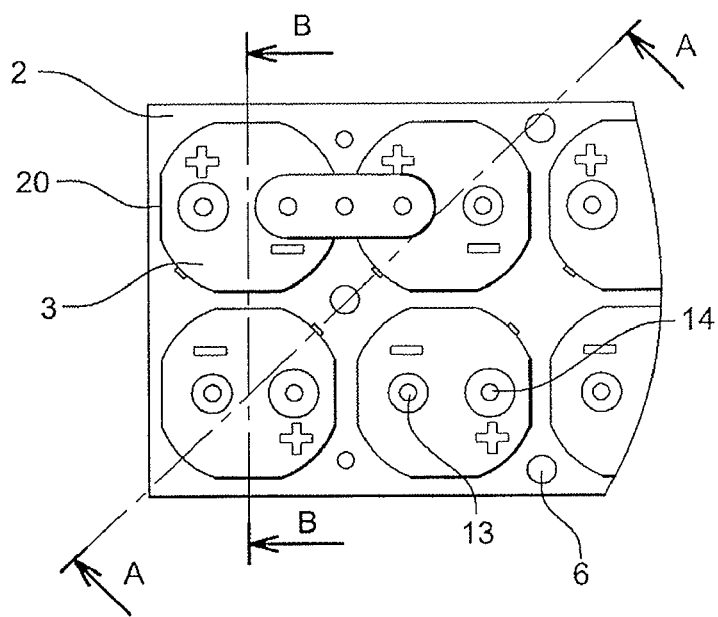
FIG. 6 is a top view of the retention system with storage cells mounted therein.

FIG. 1 is a perspective view of a retention system with storage cells 1 mounted. FIG. 6 shows a top view of a retention system with the storage cells mounted, and FIGS. 7 and 8 are cross-section views of the retention system of FIG. 6 along respectively lines A-A and B-B.

Figure 7:
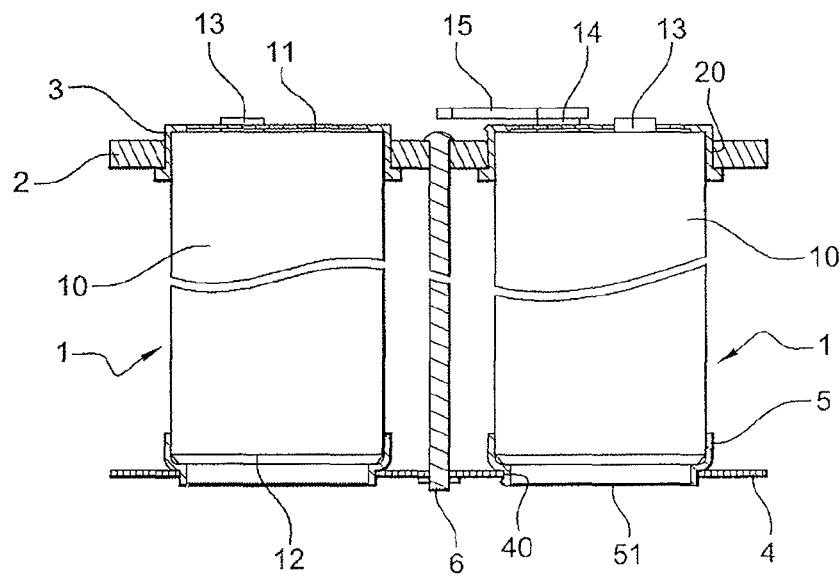
FIG. 7 is a cross-section of the retention system of FIG. 6, along line A-A.
Figure 8:
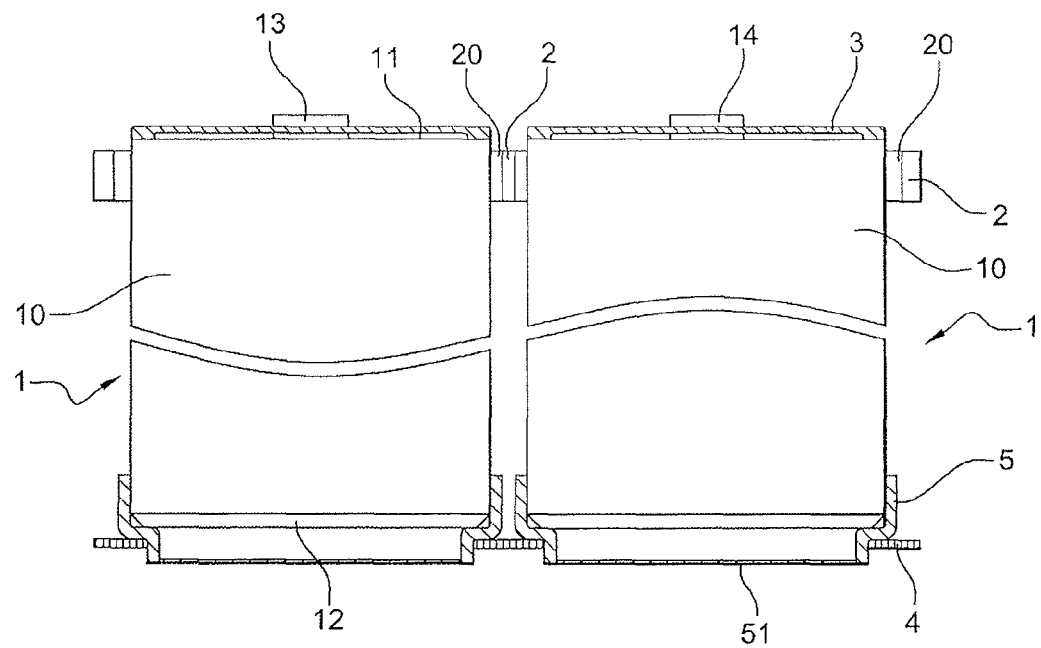
FIG. 8 is a cross-section through the retention system of FIG. 6 along line B-

Each electrochemical storage cell 1 has a container 10 comprising a lid or top portion 11 with electrical output terminals 13, 14 and a base or bottom portion 12 (see FIGS. 7 and 8). The terminals 13, 14 of each storage cell 1 are connected to the terminals of adjacent cells or to the power output terminals of the battery by means of an electrical connection 15.

The retention system comprises a first tray member 2 provided with through openings 20.

The retention system also comprises a plurality of adapter cups 3. Each adapter cup 3 is adapted to be fitted onto the top portion 3 of the storage cell 1. Each adapter cup 3 is also designed to be received within one of the through openings 20 of the first tray member 2.

As explained above, this makes the retention system modular and mechanically strong.

The retention system further comprises a second tray member 4. Second tray member 4 is provided with through openings 40.

The retention system further comprises a plurality of rings 5. Each ring 5 is adapted to be placed on the bottom portion or base 12 of a storage cell 1. Each ring is also adapted to be received in one of the through openings 40 of the second tray member 4.

The assembly comprising the second tray member and plurality of rings adds to modularity and mechanical strength of the retention system.

The storage cells 1 are designed to be arranged parallel to each other as shown in FIG. 1. The first and second tray members 2, 4 are designed to be arranged parallel to each other, and perpendicular to the longitudinal direction of the storage cells 1.

The retention system comprises means 6 for clamping the first and second tray members 2, 4 together, for example using tie rods. The clamping means 6 make it possible to draw the first and second tray member is 2, 4 towards each other, keeping them parallel to each other, and then clamping them. Thus, once the retention system is mounted, the storage cells 1 can no longer shift either along their longitudinal axis direction (being retained by the clamping means 6) nor along a transverse direction (being retained by the tray members).

Figure 2:
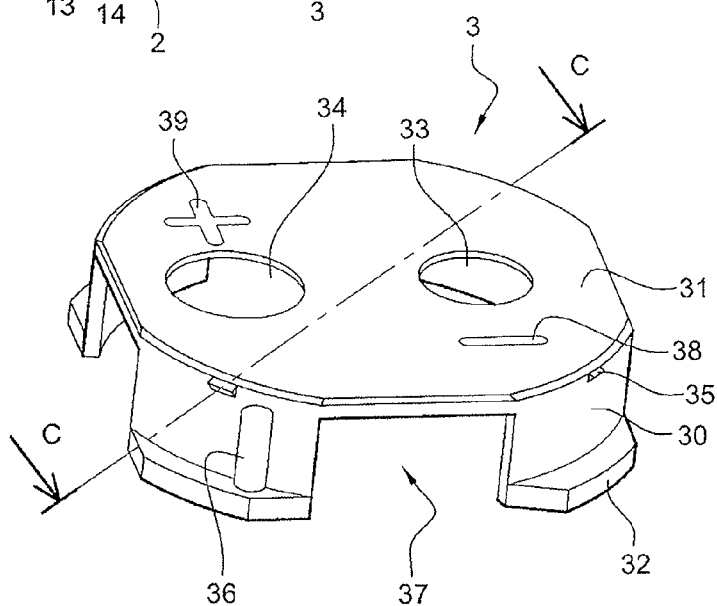
FIG. 2 is a perspective view of an adapter cup for a storage cell retention system.
Figure 3:
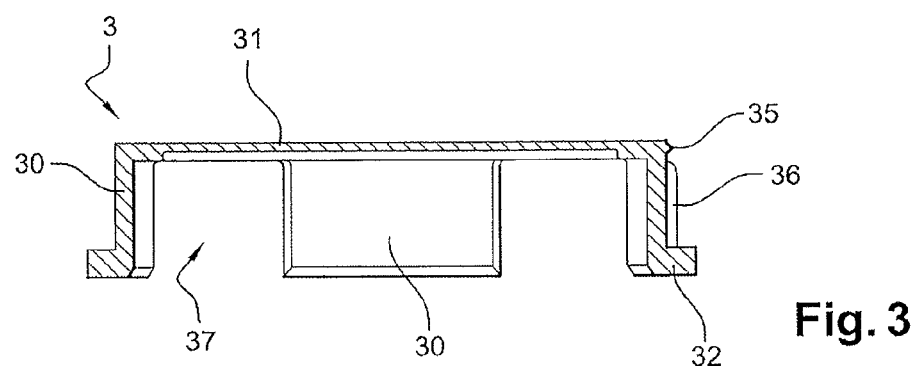
FIG. 3 shows a cross-section through the adapter cup of FIG. 2 along line C-C.

FIG. 2 is a perspective view of an adapter cup of a storage cell retention system. FIG. 3 is a cross-section of the adapter cup of FIG. 2 along line C-C.

Each adapter cup 3 comprises a substantially cylindrical body 30 closed by a cover 31.

Each adapter cup 3 can optionally include cut out portions 37 on its sides 30. The cut out portions 37 can occupy the whole height of sides 30. There are for example four cut out portions. The cover 31 of each adapter cup 3 has a circular shape of which four arcs of the circle are missing replaced by segments. Pairwise, the segments are substantially parallel. Consequently, two storage cells can be placed closer one to the other then if the cover of the adapter cup formed a full circle. This is particularly visible on FIGS. 1 and 6. The cut out portions 37 thus make it possible to make the battery using a retention system according to the invention more compact.

As can be seen in FIG. 8, the storage cells do not touch each other at their adjacent cut out portions 37. In effect, the containers 10 of the cells are separated by a portion of the first tray member. This portion of the first tray member comprised between two adjacent cells is maximized as a result of the absence of sides on the adapter cup at this specific position. This makes it possible to increase rigidity of the first tray member 2.

Once the retention system has been mounted with the cells, the presence of the cut out portions 37 of adapter cup 3 ensures the adapter cups 3 will not be able to rotate with respect to tray 2.

Additionally, two holes 33, 34 in cover 31 of each adapter cup 3 can be seen in FIG. 2. Each of the holes 33, 34 is designed for passage of one of the electrical output terminals 13, 14 of the cell 1 on which the adapter cup 3 is intended to be placed. Once the adapter cups have been placed on the cells, an electrical connection can readily be established between two terminals of opposing polarities of two adjacent cells.

The holes 33, 34 can be of differing size, with an electrical polarity marking 38, 39 adjacent to each of the holes. On FIG. 2, the smaller hole 33 corresponds to the negative terminal and is marked with a "−" 38 and the larger hole 34 corresponds to the positive terminal associated with a "+" marking 39. In this way, there is only one way of placing each adapter cup 3 on a storage cell 1, thereby avoiding making any mistake in the subsequent electrical connections. Further, the holes 33, 34 make it possible to stop rotation of the cell 1 in adapter cup 3.

Each adapter cup 3 can further include a locating lug 36 situated on body 30. This locating lug 36 is adapted to enter a corresponding groove on first tray member 2. The presence of this locating lug ensures there is only one single way of placing each adapter cup 3 in a through opening 20 of the first tray member. This avoids the possibility of making any mistake in subsequent electrical connections.

Once the retention system has been mounted, the presence of locating lug 36 on an adapter cup 3 also makes it possible to block rotation of the adapter cup 3 with respect to first tray member 2.

Figure 4:
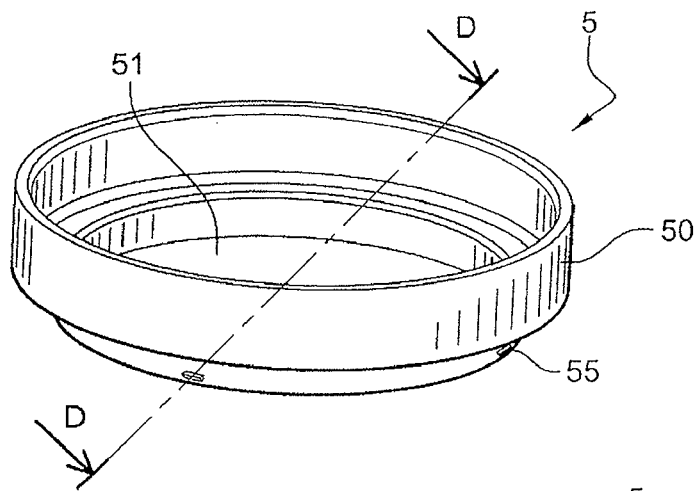
FIG. 4 is a perspective view of a ring for a cell retention system.
Figure 5:
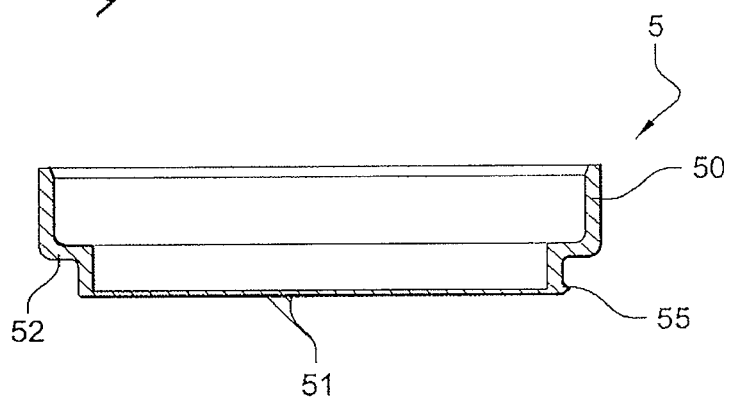
FIG. 5 is a cross-section of the ring in FIG. 4, taken along line D-D.

FIG. 4 is a perspective view of a ring of a storage cell retention system. FIG. 5 shows a cross-section through the ring of FIG. 4 along D-D.

Each ring 5 has a substantially cylindrical body 50. Body 50 is preferably closed by a base 51.

The base 51 of each ring 5 has the purpose, once the retention system is mounted with the cells, of protecting the cell on which the ring 5 is placed. Base 51 is preferably provided with a frangible disc. Thus, should a cell mounted in a battery show excessive pressure in operation and include a safety device for relieving excess pressure from the bottom, the frangible disc can detach, allowing release of pressure. Hot gases and/or electrolyte can now escape via the ruptured base 51. The bases 51 of the other rings with their frangible discs in place make it possible to protect the other cells from the hot gases and/or splashed electrolyte. This decreases the risk of contaminating cells that are in good condition with electrolyte.

Thus, after mounting the retention system with the cells, a space will exist between the bottom 12 of the cell and the base 51 of the ring 5. This space can receive gases released by the cell when the safety device is activated. If this pressure remains limited, the disc of the ring will not rupture. Gas and electrolyte will not be spread.

Further, each adapter cup 3 can include shoulder portions 32 for abutment with the first tray member 2. The shoulder portions 32 of each adapter cup 3 are located on body 30 at the opposite end to cover 31.

Similarly, each ring 5 can include shoulder portions 52 for abutment against second tray member 4. The shoulder portions 52 of each ring 5 are located between body 50 and base 51.

As a consequence, after mounting the retention system, the first tray member 2 is sandwiched between an end of the clamping means 6 and shoulder portions 32 of the plurality of adapter cups 3. Similarly, the second tray member 4 is sandwiched between one end of clamping means 6 and the shoulder portions 52 of the plurality of rings 5. The shoulder portions 32, 52 of adapter cups 3 and rings 5 participate in ensuring good mechanical strength of the retention system once mounted.

The adapter cups 3 and rings 5 are for example of electrically insulating material such as a plastics material. Thus, electrical insulation is set up by each adapter cup 3 and each ring 5 between the cells 1 and the first and second tray members 2, 4.

In particular, the covers 31 of adapter cups 3 and the bases 51 of the rings 5 insulate the cells and increase leakage path length, in particular for high voltages employed in batteries, for example up to 10,000 V.

The body 30 of an adapter cup 3 can have a height of between 1 mm and the full height of the cell.

The first tray member 2 rests against the body 30 of each adapter cup 3. When the adapter cup 3 includes cut out portions 37, these should have limited width to avoid the possibility of first tray member 2 coming into electrical contact with the containers 10 of the storage cells 1, as is depicted in particular in FIG. 8.

The second tray member 4 rests against the body 50 of ring 5.

It is consequently possible to make the first and second tray members 2, 4 of an electrically conducting material, for example of metal, as these are insulated from the cells. Metal tray members have the advantage of being inexpensive to produce. They also have the advantage of being able to be produced by simple tooling operations rather than by molding which is a longer manufacturing process with more stringent requirements than the working of sheet metal. This makes for lower production costs of the retention system. The first and second tray members can typically be worked by pressing, stamping, die stamping, laser cutting, water jet cutting, electro-erosion, milling or any other suitable technique for metal working.

Further, the functions of electrical insulation of the two terminals and mechanical retention are disassociated, which makes it possible to employ tray members of electrically conducting material which would perform better mechanically than electrically insulating materials.

Alternatively, the adapter cups 3 and/or rings 5 are of electrical conducting material. The first and/or second tray members 2, 4 are now of electrical insulating material in order to ensure electrical insulation between two adjacent cells.

In another alternative embodiment, both the adapter cups 3, rings 5 and first and second tray members 2, 4 are of electrically insulating material.

The first and second tray members 2, 4 are preferably flat. This makes them easy to produce.

Flat and relatively thin tray members allows for some deformation of the tray members. This makes it possible to keep the retention system under load in order to improve behavior towards vibrations, and without bending originating from deformation under load interfering with the connections 15.

Further, each adapter cup 3 can include at least one boss portion 35 for retaining the first tray member 2. The boss portions 35 on each adapter cup 3 are located on the body, close to the cover 31 of the adapter cup 3. Each ring 5 can likewise include at least one boss portion 55 for retaining the second tray member 4. The boss portions 55 of each ring 5 are located on the body, close to the base 51 of the ring 5.

When each adapter cup 3 is received in through opening 20 of first tray member 2, the first tray member 2 is then held in position between the shoulder portions 32 of the adapter cup 3 and the boss portions 35 of the adapter cup. Likewise, when each ring 5 is received in a through opening 40 of the second tray member 4, this second tray member 4 is held in position between the shoulder portions 52 of ring 5 and the boss portions 55 of the ring 5.

Pre-assembly is thus made possible prior to securement with the clamping means 6. This also makes it possible to pre-assemble the plurality of adapter cups 3 or rings 5 in the plurality of through openings 20, 40 of first tray member 2 or respectively second tray member 4, in order to facilitate handling of the tray members fitted with adapter cups or rings.

Where the material of each adapter cup 3 and each ring 5 is slightly yielding, this makes it possible to plug in each adapter cup 3, and ring 5 into a through opening 20, 40 of the first/second tray member 2, 4 by elastic deformation before placing adapter cup 3/ring 5 on the top portion 11/bottom portion 12 of a storage cell 1.

The through openings 20, 40 of the first and second tray members 2, 4 have an inner shape which matches the outer shape of the adapter cups and rings respectively, in particular at the edges of the adapter cups and, respectively, rings.

The body 30 of each adapter cup 3 acts as a guide for correctly positioning the adapter cup 3 on the top portion 11 of a cell and then the adapter cup 3 inside a through opening 20 of the first tray member. Likewise, body 50 of the ring 5 acts as a guide for correctly positioning ring 5 on the base 12 of a cell and then ring 5 in a through opening 40 of the second tray member.

The retention system is modular. In effect, the same first tray member 2 can be employed with adapter cups 3 having varying sizes of holes 33, 34 or varying positions of the holes 33, 34. Similarly, in the case of cells with slightly different diameters, the same first and second tray members 2, 4 can be employed, along with adapter cups 3 and rings 5 of the same outer shape but of varying thicknesses, always provided that the thickness is sufficient to guarantee the electrical insulation discussed above.

The retention system can consequently provide a multitude of functions in addition to mechanical securement of the storage cells:
- electrical insulation of the cells,
- cell location provided for by the holes 33, 34 of differing sizes in adapter cups 3, with their associated markings 38, 39, along with the locating lug 36 on each adapter cup 3,
- pre-assembly of the cells, made possible by the boss portions 35 and shoulder portions 32 of each adapter cup 3 and the boss portions 55 and shoulder portions 52 of each ring 5,
- protection and sealing against discharge of hot gas and/or electrolyte for the cells provided by the base 51 of each ring 5.

The retention system also makes it possible to economize on development time in view of it modularity.

The invention also provides a battery made up of a plurality of storage cells and a retention system as described above.

The invention claimed is:

1. An electrochemical storage cell retention system comprising a plurality of electrochemical storage cells arranged side-by-side and parallel to each other, each storage cell having a container comprising a bottom portion, and a top portion provided with electrical output terminals, the system comprising:
    a first tray member provided with through openings;
    a plurality of adapter cups, each adapter cup being designed to be placed on the top portion of a storage cell and to be received in one of the through openings of the first tray member, each adapter cup being of an electrically insulating material;
    a second tray member provided with through openings; and
    a plurality of rings, each ring being adapted to be placed on the bottom portion of the storage cell and to be received in one of the through openings of the second tray member, each ring being of an electrically insulating material.

2. The storage cell retention system according to claim 1, wherein the first tray member is of an electrically conducting material.

3. The storage cell retention system according claim 1, wherein each adapter cup includes a shoulder portion acting as an abutment at the first tray member.

4. The storage cell retention system according to claim 3, wherein each adapter cup includes at least one boss portion for retaining the first tray member.

5. The storage cell retention system according to claim 1, wherein each adapter cup includes cut-out portions at its sides.

6. The storage cell retention system according to claim 1, wherein each adapter cup includes two holes of differing sizes and a marking for electrical polarity, each one of the holes allowing the passage of one of the electrical output terminals of a storage cell.

7. The storage cell retention system according to claim 6, wherein each adapter cup further includes a locating lug.

8. The storage cell retention system according to claim 1, wherein the second tray member is of an electrically conducting material.

9. The storage cell retention system according to claim 1, wherein each ring is provided with a base including a frangible disc.

10. The storage cell retention system according to claim 1, wherein each ring includes a shoulder portion acting as an abutment at the second tray member.

11. The storage cell retention system according to claim 1, wherein each ring includes a least one boss portion for retention of the second tray member.

12. A battery comprising:
    a plurality of electrochemical storage cells arranged side-by-side and parallel to each other;
    a storage cell retention system, each storage cell having a container comprising a bottom portion, and a top portion provided with electrical output terminals, the system comprising:
    a first tray member provided with through openings, and
    a plurality of adapter cups, each adapter cup being designed to be placed on the top portion of a storage cell and to be received in one of the through openings of the first tray member, each adapter cup being of an electrically insulating material;
    a second tray member provided with through openings;
    a plurality of rings, each ring being adapted to be placed on the bottom portion of the storage cell and to be received in one of the through openings of the second tray member, each ring being of an electrically insulating material.

* * * * *